(12) United States Patent
Taherzadeh Boroujeni et al.

(10) Patent No.: US 11,838,966 B2
(45) Date of Patent: Dec. 5, 2023

(54) SEPARATE L1-REPORT WITH LONG INDEX FOR OUT-OF-CELL BEAMS

(71) Applicant: QUALCOMM Incorporated, San Diego, CA (US)

(72) Inventors: Mahmoud Taherzadeh Boroujeni, San Diego, CA (US); Tao Luo, San Diego, CA (US); Wooseok Nam, San Diego, CA (US); Jelena Damnjanovic, Del Mar, CA (US); Peter Gaal, San Diego, CA (US); Iyab Issam Sakhnini, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 125 days.

(21) Appl. No.: 17/187,593

(22) Filed: Feb. 26, 2021

(65) Prior Publication Data

US 2022/0279612 A1 Sep. 1, 2022

(51) Int. Cl.
| | |
|---|---|
| *H04W 76/15* | (2018.01) |
| *H04B 17/336* | (2015.01) |
| *H04W 76/11* | (2018.01) |
| *H04W 24/10* | (2009.01) |
| *H04W 72/044* | (2023.01) |
| *H04W 72/23* | (2023.01) |

(52) U.S. Cl.
CPC .......... *H04W 76/15* (2018.02); *H04B 17/336* (2015.01); *H04W 24/10* (2013.01); *H04W 72/046* (2013.01); *H04W 72/23* (2023.01); *H04W 76/11* (2018.02)

(58) Field of Classification Search
CPC ... H04W 76/15; H04W 24/10; H04W 72/042; H04W 72/046; H04W 76/11; H04B 17/336; H04B 7/0617; H04B 7/024
See application file for complete search history.

(56) References Cited

U.S. PATENT DOCUMENTS

| | | | |
|---|---|---|---|
| 2011/0281583 A1* | 11/2011 | Hole | H04W 24/10 455/436 |
| 2013/0286960 A1 | 10/2013 | Li et al. | |

(Continued)

FOREIGN PATENT DOCUMENTS

WO   WO-2021161065 A1 *  8/2021   ............ H04W 24/10

OTHER PUBLICATIONS

International Search Report and Written Opinion—PCT/US2022/070122—ISA/EPO—dated May 17, 2022.

(Continued)

*Primary Examiner* — Michael K Phillips
(74) *Attorney, Agent, or Firm* — ArentFox Schiff LLP

(57) ABSTRACT

A user equipment may be configured to perform UE indication to temporarily suspend report occasions. In some aspects, the user equipment may receive, from a base station, out-of-cell reporting configuration including an out-of-cell reporting parameter for reporting layer one (L1) channel information for an out-of-cell beam. Further, the user equipment may send, to the base station for beam selection in consideration of simultaneous access to another base station based on the out-of-cell reporting parameter, the L1 channel information for the out-of-cell beam.

30 Claims, 9 Drawing Sheets

(56) References Cited

U.S. PATENT DOCUMENTS

| | | | |
|---|---|---|---|
| 2014/0228031 A1* | 8/2014 | Masini | H04W 36/0005 |
| | | | 455/436 |
| 2016/0337916 A1* | 11/2016 | Deenoo | H04W 36/0094 |
| 2018/0035348 A1* | 2/2018 | Axmon | H04W 24/10 |
| 2018/0049137 A1* | 2/2018 | Li | H04W 52/242 |
| 2019/0215136 A1* | 7/2019 | Zhou | H04B 7/088 |
| 2019/0357103 A1* | 11/2019 | Jin | H04W 36/14 |
| 2020/0028652 A1* | 1/2020 | Bai | H04B 7/088 |
| 2020/0145068 A1 | 5/2020 | Chendamarai Kannan et al. | |
| 2020/0196161 A1* | 6/2020 | Ahn | H04W 56/001 |
| 2020/0351982 A1* | 11/2020 | Kim | H04W 12/03 |
| 2020/0359251 A1* | 11/2020 | Gunnarsson | H04W 56/007 |
| 2020/0374960 A1* | 11/2020 | Deenoo | H04W 72/1284 |
| 2021/0176692 A1* | 6/2021 | Rugeland | H04W 36/0072 |
| 2021/0329515 A1* | 10/2021 | Sharma | H04W 36/08 |
| 2022/0046510 A1* | 2/2022 | Kung | H04W 74/0841 |
| 2022/0216904 A1* | 7/2022 | Zhu | H04W 24/08 |

OTHER PUBLICATIONS

3GPP: "3rd Generation Partnership Project, Technical Specification Group Radio Access Network, NR, Medium Access Control, Protocol Specification (Release 15)", TS 38.321, V15.8.0 (Dec. 2019), 3GPP Standard, Technical Specification, Mobile Competence Centre, 650, Route Des Lucioles, F-06921 Sophia-Antipolis Cedex, France, vol. RAN WG2, No. V15.8.0 , Jan. 7, 2020, 78 Pages, XP051860530, Section 1, 5.1, 5.4.1, 6.1.3.9.

* cited by examiner

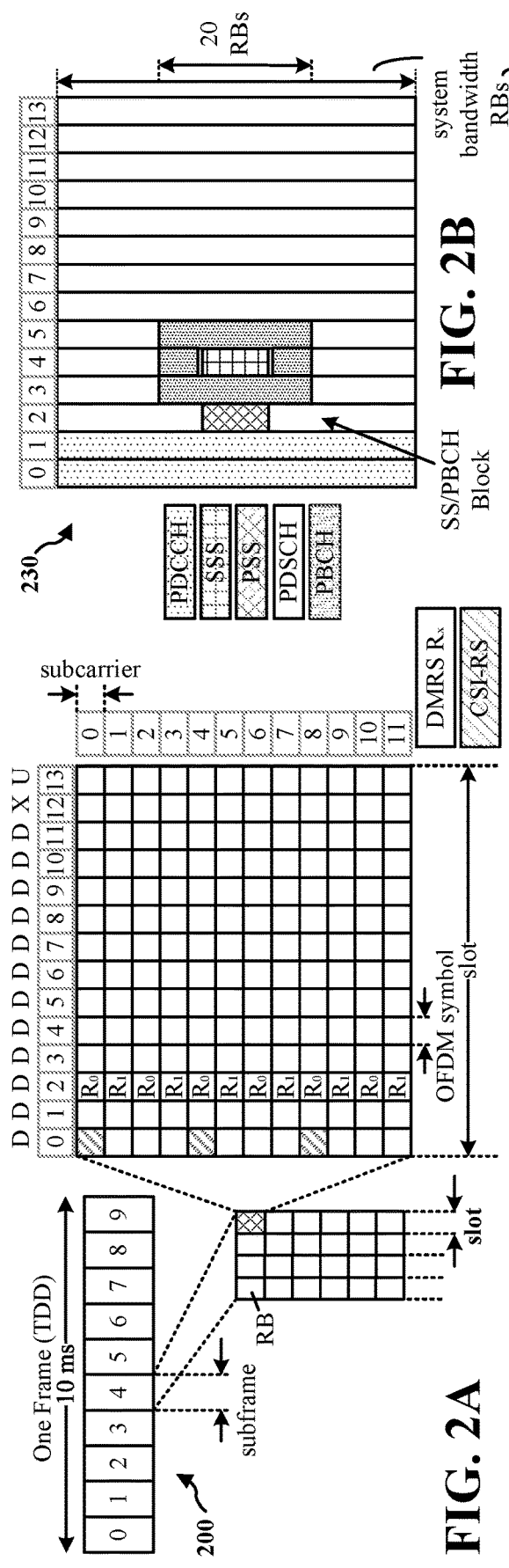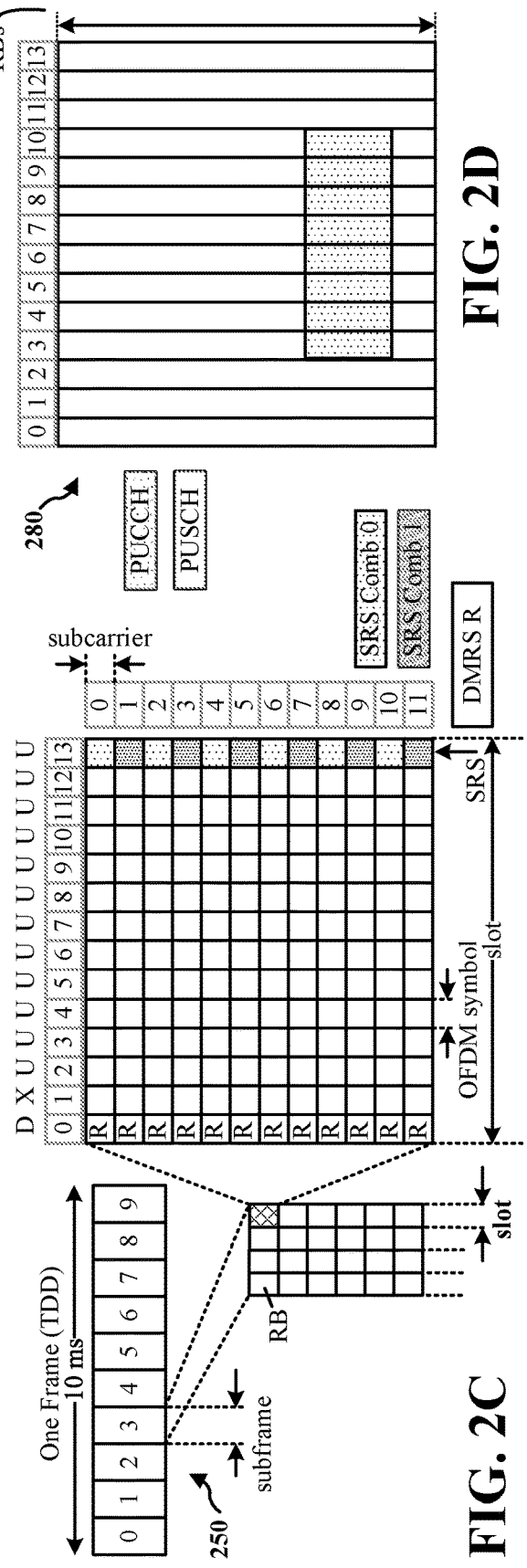

SEPARATE L1-REPORT WITH LONG INDEX FOR OUT-OF-CELL BEAMS

BACKGROUND

Technical Field

The present disclosure relates generally to wireless communication, and more particularly, implementing separate layer one (L1) reports for out-of-cell beams.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at a user equipment (UE) comprising receiving, from a base station, out-of-cell reporting configuration including an out-of-cell reporting parameter for reporting L1 channel information for an out-of-cell beam; and transmitting, to the base station for beam selection in consideration of simultaneous access to another base station based on the out-of-cell reporting parameter, the L1 channel information for the out-of-cell beam.

The disclosure also provides an apparatus (e.g., a UE) including a memory storing computer-executable instructions and at least one processor configured to execute the computer-executable instructions to receive, from a base station, out-of-cell reporting configuration including an out-of-cell reporting parameter for reporting L1 channel information for an out-of-cell beam; and transmit, to the base station for beam selection in consideration of simultaneous access to another base station based on the out-of-cell reporting parameter, the L1 channel information for the out-of-cell beam. In addition, the disclosure also provides an apparatus including means for performing the above method, and a non-transitory computer-readable medium storing computer-executable instructions for performing the above method.

An example implementation includes a method of wireless communication at a base station comprising sending, to a UE for an out-of-cell beam measured at the UE, reporting configuration including an out-of-cell reporting parameter for reporting L1 channel information for the out-of-cell beam; receiving, from the UE for consideration of simultaneous access of the base station and another base station, the L1 channel information for the out-of-cell beam based on the out-of-cell reporting parameter; determining to instruct the UE to enter a simultaneous access mode with the another base station based on the L1 channel information for the out-of-cell beam; and transmitting a beam operation instructing the UE to enter the simultaneous access mode using the out-of-cell beam.

The disclosure also provides an apparatus (e.g., a base station) including a memory storing computer-executable instructions and at least one processor configured to execute the computer-executable instructions to send, to a UE for an out-of-cell beam measured at the UE, reporting configuration including an out-of-cell reporting parameter for reporting L1 channel information for the out-of-cell beam; receive, from the UE for consideration of simultaneous access of the base station and another base station, the L1 channel information for the out-of-cell beam based on the out-of-cell reporting parameter; determine to instruct the UE to enter a simultaneous access mode with the another base station based on the L1 channel information for the out-of-cell beam; and transmit a beam operation instructing the UE to enter the simultaneous access mode using the out-of-cell beam. In addition, the disclosure also provides an apparatus including means for performing the above method, and a non-transitory computer-readable medium storing computer-executable instructions for performing the above method.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame, in accordance with some aspects of the present disclosure.

FIG. 2B is a diagram illustrating an example of DL channels within a 5G/NR subframe, in accordance with some aspects of the present disclosure.

FIG. 2C is a diagram illustrating an example of a second 5G/NR frame, in accordance with some aspects of the present disclosure.

FIG. 2D is a diagram illustrating an example of UL channels within a 5G/NR subframe, in accordance with some aspects of the present disclosure.

DETAILED DESCRIPTION

Figure 1:
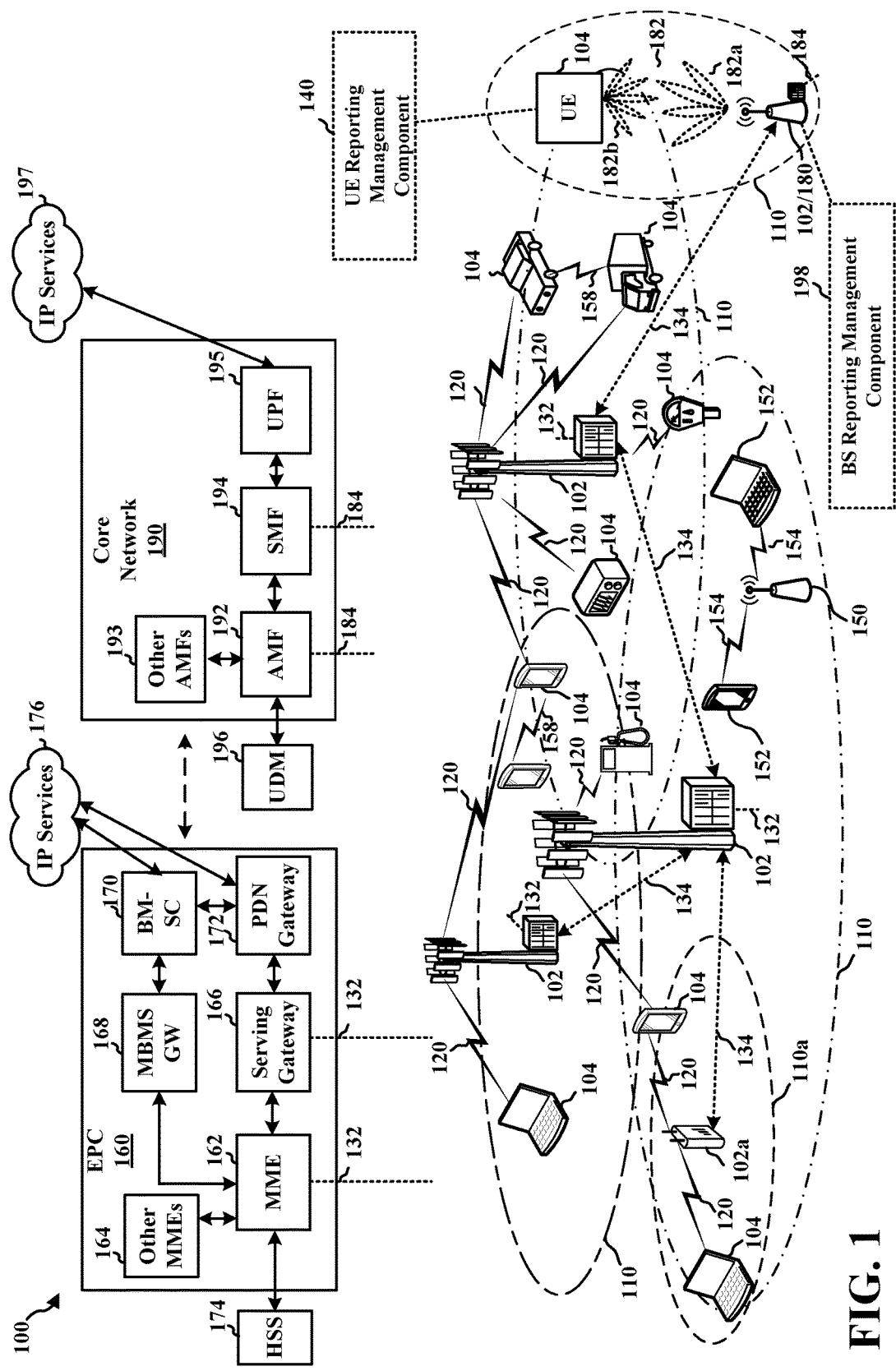
FIG. 1 is a diagram illustrating an example of a wireless communications system and an access network, in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to a person having ordinary skill in the art that these concepts may be practiced without these specific details. In some instances, structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various implementations relate generally to a procedure for implementing separate layer one (L1) reports for in-cell beams and out-of-cell beams. In some aspects, a base station may transmit in-cell reporting configuration for reporting channel information for in-cell beams and out-of-cell configuration reporting for reporting channel information for out-of-cell beams to a UE. In response, the UE may determine the channel information for in-cell beams and report in-cell channel information for the in-cell beams in accordance with the in-cell reporting configuration, and determine the channel information for out-of-cell beams and report out-of-cell channel information for the out-of-cell beams in accordance with the out-of-cell reporting configuration. As described herein, reporting the out-of-cell beams may require significantly more overhead in comparison to reporting in-cell beams due to the sheer number of out-of-cell beams. Accordingly, in some aspects, a UE may be configured to minimize or reduce overhead, inefficient use of time and frequency resources, and/or power consumption by separately transmitting reporting information for in-cell beams and out-of-cell beams with different reporting parameters.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

In an aspect, a base station 102 may include a BS reporting management component 198 configured to manage reporting of L1 channel information of in-cell beams and out-of-cell beams by one or more UEs 104. Further, in an aspect, a UE 104 may include a UE reporting management component 140 configured to manage reporting of L1 channel information of in-cell beams and out-of-cell beams measured at the UE.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

A base station 102, whether a small cell 102a or a large cell (for example, macro base station), may include or be referred to as an eNB, gNodeB (gNB), or another type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (416 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182a. The UE 104 may receive the beamformed signal from the base station 180 in one or more receive directions 182b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a satellite phone, a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIGS. 2A-2D include example diagrams 200, 230, 250, and 280 illustrating examples structures that may be used for wireless communication by the base station 102 and the UE 104, e.g., for 5G NR communication. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. For slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu}*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more CCE, each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
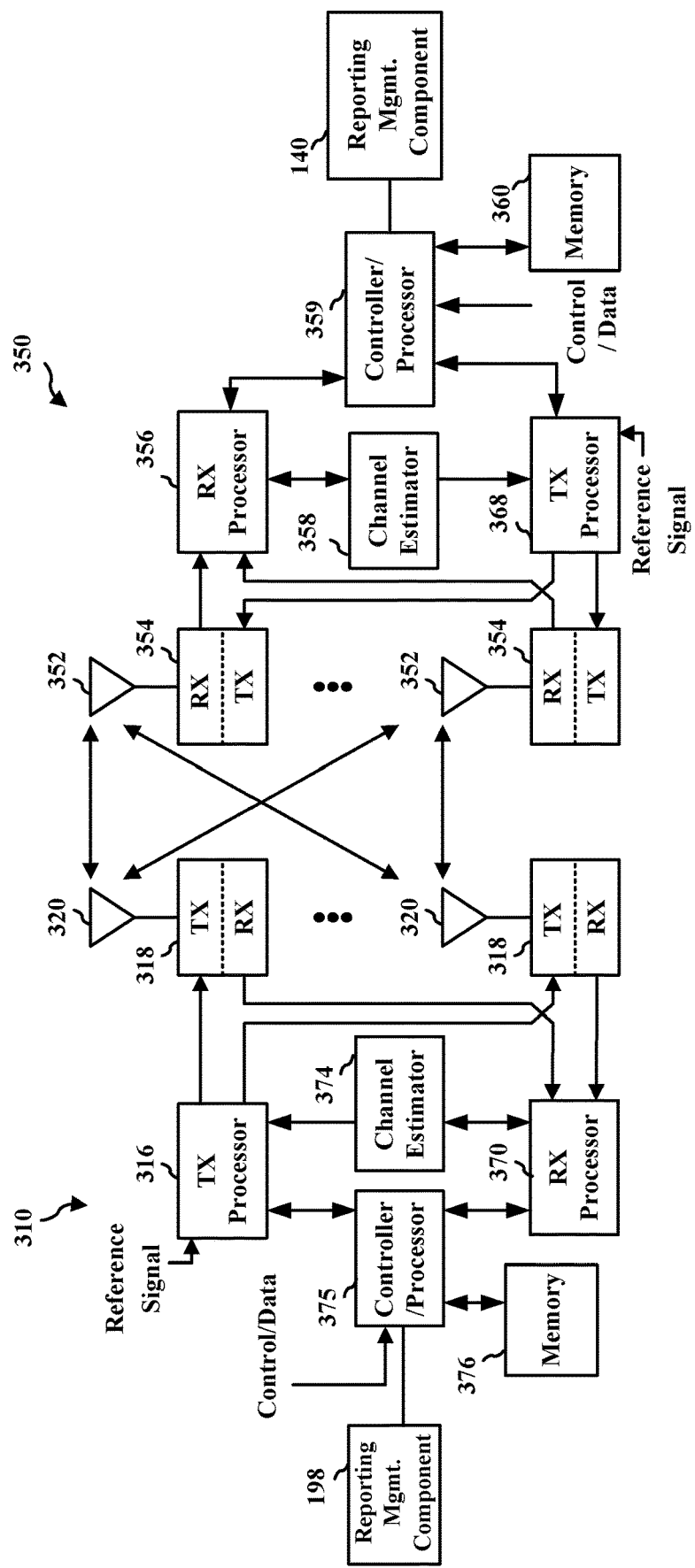
FIG. 3 is a diagram illustrating an example of a base station and a UE in an access network, in accordance with some aspects of the present disclosure.

FIG. 3 is a block diagram of a base station 102/180 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356.

The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 102/180, the controller/processor 359 provides RRC layer functionality associated with system information (for example, MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK or NACK protocol to support HARQ operations.

In the UE 104, at least one of the TX processor 368, the RX processor 356, and the controller/processor 359 may be configured to perform aspects in connection with the UE reporting management component 140 of FIG. 1.

In the base station 102/180, at least one of the TX processor 316, the RX processor 370, and the controller/processor 375 may be configured to perform aspects in connection with BS reporting management component 198 of FIG. 1.

In some aspects, a UE may be capable of maintaining simultaneous (i.e., concurrent) connections to multiple transfer receive points (TRPs) (e.g., a base station) and/or fast switching among a plurality of cells. For example, in a cell-free MIMO implementation or other UE-centric implementation, a UE may be served by two or more TRPs by sharing time and frequency resources. In order to implement such measures, L1 reporting performed for beams (i.e., in-cell beams) of a single TRP must be must be extended to the beams (i.e., out-of-cell beams) of other TRPs, in order to perform beam assignment and/or TRP assignment. In some aspects, the pool of candidate beams in UE centric implementations may be significantly larger than network-centric approaches. For example, merely identifying the physical cell identifier of a beam may cause burdensome processing overhead during reporting as there are one-thousand and eight different values for physical cell identifiers. In addition, increased reporting may waste battery capacity, thereby having an adverse effect on the operation of the UE. Further, transmission of reporting messages via an UL channel may interfere with communications between other UEs and the network The present disclosure provides techniques for implementing separate L1 reports for out-of-cell beams. As described in detail herein, a UE may be configured to transmit channel information for out-of-cell beams according to a first configuration tailored to accommodate for the large number out-of-cell beams, and transmit channel information for in-cell beams according to a second configuration. Accordingly, the present techniques enable a UE to report channel information based upon the type of beam (i.e., out-of-cell or in-cell), thereby minimizing or reducing overhead, uplink interference to other UEs, and/or power consumption, and preserving time and frequency resources.

Referring to FIGS. 4-8, in one non-limiting aspect, a system 400 is configured to facilitate faster throughput via simultaneous connections to multiple TRPs without causing burdensome reporting overhead by implementing separate L1 reports for different types of beams (i.e., out-of-cell or in-cell).

Figure 4A:
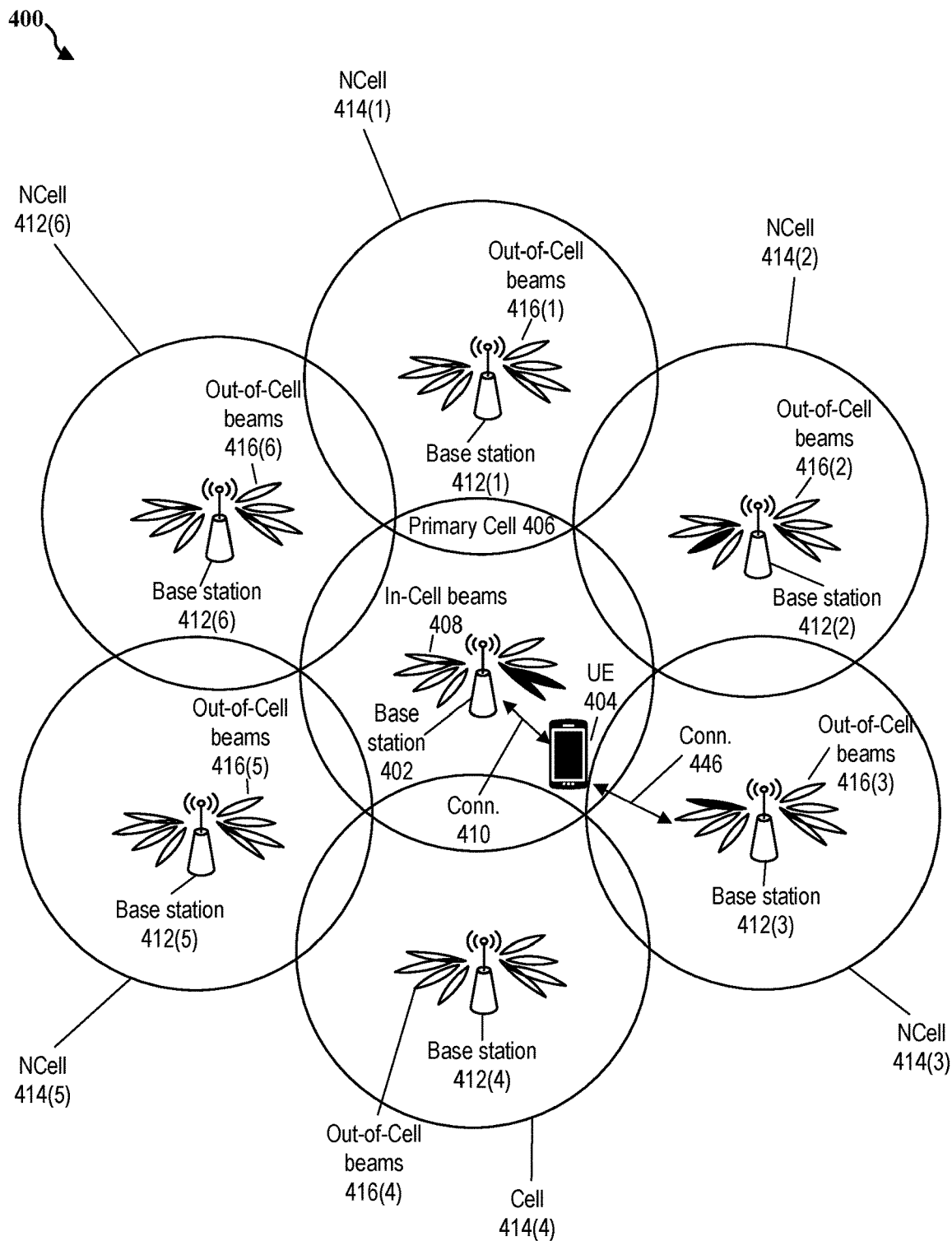
FIG. 4A is a first diagram illustrating example communications and components of a base station and UEs, in accordance with some aspects of the present disclosure.
Figure 4B:
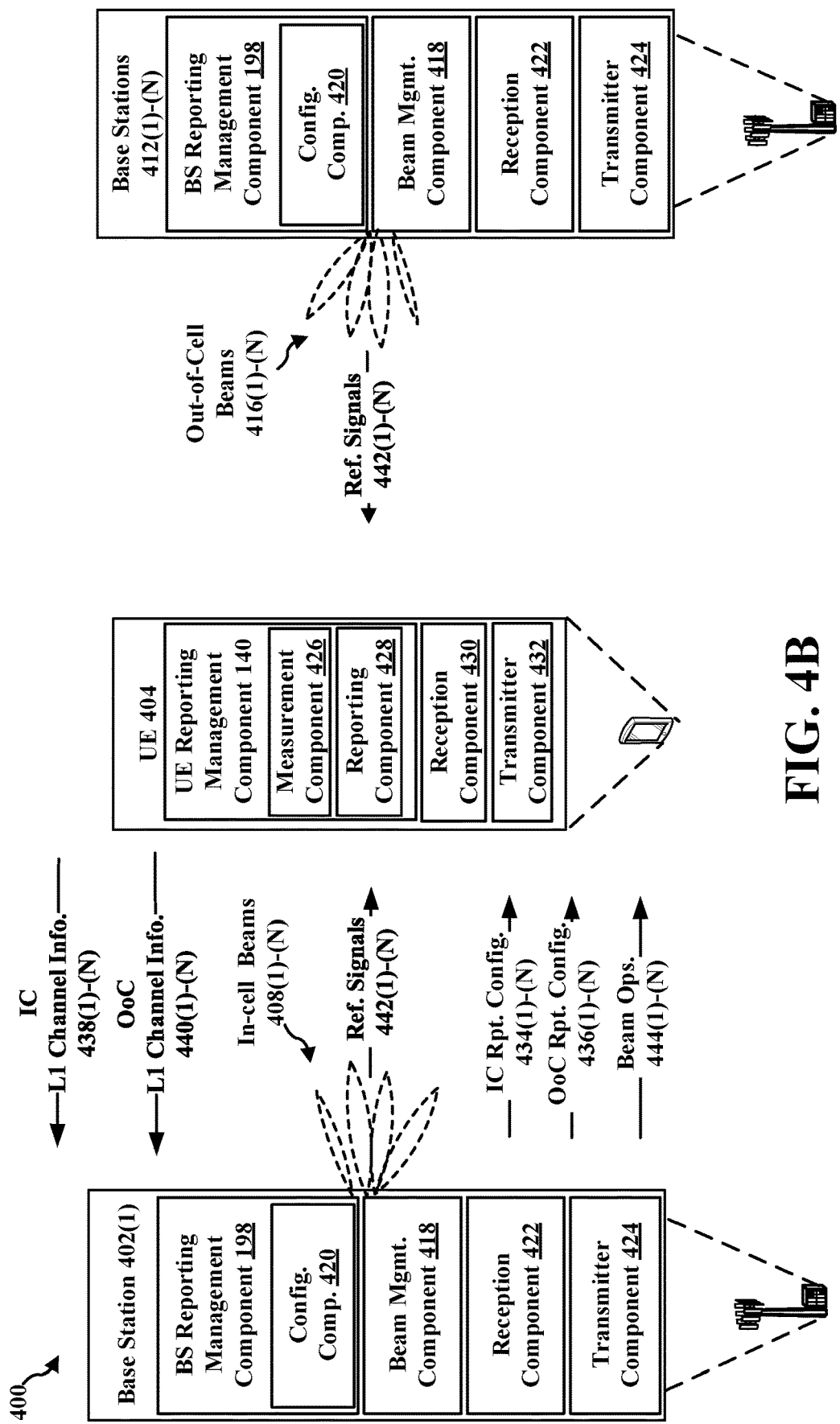
FIG. 4B is a second diagram illustrating example communications and components of a base station and UEs, in accordance with some aspects of the present disclosure.

FIGS. 4A-B are diagrams illustrating example communications and components of base stations and UEs. As illustrated in FIG. 4A, the system 400 may include a base station 402 (e.g., the base station 102/180) serving a UE 404 (e.g., the UE 104) via a primary cell 406. As illustrated in FIG. 4A, the base station 402 may form the primary cell 406 via a plurality of in-cell beams 408 with the UE 404 maintaining a connection 410 to the base station 402 via one or more beams of the plurality of in-cell beams 408.

In addition, the system 400 may include a plurality of other base stations 412(1)-(N) each forming a plurality of neighboring cells (NCells) 414(1)-(N) via the plurality of out-of-cell beams 416. For example, a first base station 412(1) may form a first neighboring cell 414(1) via a first plurality of out-of-cell beams 416(1), a Nth base station 412(N) may form the Nth neighboring cell 414(N) via the Nth plurality of out-of-cell beams 416(N), and so forth. As described in detail in FIG. 4B, the UE 404 may measure the out-of-cell beams 416(1)-(N) and transmit first L1 channel information (e.g., a CSI report) for the out-of-cell beams 416 to the base station 402 in accordance with an out-of-cell reporting configuration, and the UE 404 may measure the in-cell beams 408(1)-(N) and transmit second L1 channel information for the in-cell beams 408 to the base station 402 in accordance with an in-cell reporting configuration. In addition, the base station 402 may employ the first L1 channel information and the second L1 channel information (e.g., a CSI report) to determine whether the UE 404 should form another connection with one of the other base stations 412(1)-(N) based at least in part on one or more measured attributes of the out-of-cell beams 416(1)-(N). In some aspects, the in-cell L1 channel information 438 may include channel information for up to four beams of the in-cell beams 408 (e.g., the four beams of the in-cell beams 408 having the highest values for a channel attribute), and the out-of-cell L1 channel information 440 may be a report that includes channel information for up to four beams of the out-of-cell beams 416 (e.g., the four beams of the out-of-cell beams 416 having the highest values for a channel attribute). For example, in some aspects, for each of the four beams, the report may include a mapping of a beam identifier of the beam to a measured attribute of the beam. Further, the measured attributes may be communicated using differential values relative to an absolute value provided for the beam having the highest or best value of the measured attribute reported in the channel information. Additionally, in some aspects, in accordance with a periodicity defined in the in-cell reporting configuration 434, the UE 404 may report first in-cell L1 channel information 438(1) during a first in-cell reporting occasion and second in-cell L1 channel information 438(2) during a second in-cell reporting occasion. Similarly, in some aspects, in accordance with a periodicity defined in the out-of-cell reporting configuration 436, the UE 404 may report first out-of-cell L1 channel information 440(1) during a first out-of-cell reporting occasion and second out-of-cell L1 channel information 440(2) during a second out-of-cell reporting occasion.

As illustrated in FIG. 4B, the base station 402 may include the BS reporting management component 198 configured to manage the reporting of channel information of the in-cell beams 408 and the out-of-cell beams 416(1)-(N) by one or more UEs (e.g., the UE 404) being served by the base station 402, and a beam management component 418 configured to determine whether an individual UE (e.g., the UE 404) served by the base station 402 should form simultaneous connections with at least one of the other base stations 412(1)-(N) based on the channel information. Further, the base station 402 may include a configuration component 420 configured to determine configuration parameters for implementing reporting operations at the UEs (e.g., the UE 404). In addition, the base station 402 may include a reception component 422 and a transmitter component 424. The reception component 422 may include, for example, a radio frequency (RF) receiver for receiving the signals described herein. The transmitter component 424 may include, for example, an RF transmitter for transmitting the signals described herein. In an aspect, the reception component 422 and the transmitter component 424 may be co-located in a transceiver (e.g., the transceiver 610 shown in FIG. 6).

As illustrated in FIGS. 4A-B, the UE 404 may include the UE reporting management component 140 configured to manage reporting by the UE 404. As described with respect to FIG. 1, the UE reporting management component 140 may include the measurement component 426, and the reporting component 428. In addition, the UE 404 may include a reception component 430 and a transmitter component 432. The transmitter component 432 may be configured to generate signals for transmission operations and sensing as described herein. The transmitter component 432 may include, for example, a RF transmitter for transmitting the signals described herein. The reception component 430 may include, for example, a RF receiver for receiving the signals described herein. In an aspect, the reception component 430 and the transmitter component 432 may be co-located in a transceiver (e.g., the transceiver 510 shown in FIG. 5).

As described with respect to FIG. 4A, the UE 404 may be communicatively coupled with the base station 402 via the connection 410. As a result, the base station 402 may configure reporting by the UE 404 of L1 information of the in-cell beams 408 and the out-of-cell beams 416 via the connection 410. In some aspects, the configuration component 420 may determine in-cell reporting configuration 434 including one or more in-cell reporting parameters for reporting of in-cell beams by the UE 404 and out-of-cell reporting configuration 436 including one or more out-of-cell reporting parameters for reporting of out-of-cell beams by the UE 404. Further, the configuration component 420 may employ different values for the in-cell reporting parameters and out-of-cell parameters in order to mitigate the significant overhead associated with reporting the out-of-cell beams.

Some examples of the in-cell reporting configuration 434 and/or the out-of-cell reporting configuration 436 may include a CSI-ReportConfig message, a DCI message, RRC signaling. Further, in some aspects, the in-cell reporting parameters and the out-of-cell reporting parameters may configure the periodicity of reporting in-cell L1 channel information 438 for the in-cell beams and out-of-cell L1 channel information 440 for the out-of-cell beams, respectively. As an example, the configuration component 420 may determine that the in-cell reporting parameter for periodicity should be more frequent than the out-of-cell parameter for periodicity. In other words, the period in between reporting occasions for out-of-cell beams 416 may be longer than the period in between reporting occasions of in-cell beams 408.

In addition, in some aspects, the in-cell reporting parameters and the out-of-cell reporting parameters may configure the format of reporting of in-cell L1 channel information 438 for the in-cell beams and out-of-cell L1 channel information 440 for the out-cell-beams, respectively. As an example, the configuration component 420 may determine an in-cell reporting parameter that defines a schema for identifying in-cell beams, and an out-of-cell reporting parameter that defines a schema for identifying out-of-cell beams. In some instances, the reporting parameters may define whether a UE 404 employs a short index or long index to identify the in-cell beams in in-cell L1 channel information 438 for the in-cell beams and a short index or long index to identify the out-of-cell beams within out-of-cell L1 channel information 440 for the out-of-cell beams 416.

For example, in some aspects, the in-cell reporting parameter may configure the UE 404 to identify a beam using a beam identifier (e.g., a beam index) within the in-cell L1 channel information 438, in a short index implementation. As another example, in some aspects, the out-of-cell reporting parameter may configure the UE 404 to identify an out-of-cell beam using a cell identifier of the cell associated with the out-of-cell beam and a beam identifier of the out-of-cell beam, in a long index implementation. In some aspects, the out-of-cell reporting parameter may configure the UE 404 to identify an out-of-cell beam using a concatenation of the cell identifier and the beam identifier. For instance, the out-of-cell reporting parameter may configure the UE 404 to identify an out-of-cell beam using a fifteen bit index value consisting of a concatenation of ten bits of the physical cell identifier of the cell associated with the out-of-cell beam 416 and five bits of a beam identifier of the particular out-of-cell beam 416. Further, the out-of-cell reporting parameter may configure the UE 404 to identify a cell using one of a predefined number of most significant bits of a physical cell identifier, a predefined number of least significant bits of a physical cell identifier, or a predefined number of bits of an identifier of a SSS associated with the cell. In the case where the UE 404 is configured to employ the SSS as a cell identifier, the network may be configured to assign physical cell identifiers such that a subset of the physical cell identifier when combined with the identifier SSS generates a unique identifier.

Additionally, the in-cell reporting parameters and the out-of-cell reporting parameters may configure the channels employed to report the in-cell L1 channel information 438 for the in-cell beams and the out-of-cell L1 channel information 440 for the out-cell-beams, respectively. For example, the configuration component 420 may determine an in-cell reporting parameter that defines whether the UE 404 transmits the in-cell L1 channel information 438 over the PUSCH or the PUCCH, and the configuration component 420 may determine an out-of-cell reporting parameter that defines whether the UE 404 transmits the out-of-cell L1 channel information 440 over the PUSCH or the PUCCH. Further, the in-cell reporting parameters and the out-of-cell reporting parameters may determine whether the in-cell L1 channel information 438 and the out-of-cell L1 channel information 440 include a signal to noise ratio (SINR) for the reported beams or a reference signal received power (RSRP) for the reported beams.

As illustrated in FIG. 4B, the base station 402 may transmit the in-cell reporting configuration 434(1)-(N) and the out-of-cell reporting configuration 436(1)-(N) to the UE 404. Upon receipt of the in-cell reporting configuration 434(1)-(N) and the out-of-cell reporting configuration 436(1)-(N), the UE reporting management component 140 may configure the measurement component 426 and the reporting component 428 to operate in accordance with the in-cell reporting configuration 434(1)-(N) for in-cell beams 408 and the out-of-cell reporting configuration 436(1)-(N) for out-of-cell beams 416. For instance, the UE reporting management component 140 may configure the type of measurements (e.g., SINR measurements or RSRP measurements) performed by the measurement component 426, and the periodicity, the format, and the transmit channel of the in-cell L1 channel information 438 for the in-cell beams and the out-of-cell L1 channel information 440 for the out-of-cell beams 416.

As an example, the measurement component 426 may measure characteristics (e.g., a property, attribute, or a quality) of beamformed reference signals 442(1)-(N) (e.g., CSI-RS, SSB, etc.) received from the base station 402 at the reception component 430 via the in-cell beams 408 based on a reporting occasion prescribed by the in-cell reporting configuration 434(1). Further, the reporting component 428 may generate the in-cell L1 channel information 438(1) including the characteristics measured by measuring component 426 for the in-cell beams 408 based on the in-cell reporting configuration 434(1). In accordance with the in-cell reporting configuration 434(1), the reporting component 428 may generate the in-cell L1 channel information 438(1) using short indices to identify the in-cell beams 408(1)-(N). Further, the reporting component 428 may transmit the in-cell L1 channel information 438(1) over the PUSCH based on the in-cell reporting configuration 434(1).

The measurement component 426 may measure characteristics (e.g., a property or a quality) of beamformed reference signals 442(1)-(N) received from the base stations 412(1)-(N) at the reception component 430 via the out-of-cell beams 416 based on a reporting occasion prescribed by the out-of-cell reporting configuration 436(1). Further, the reporting component 428 may generate the out-of-cell L1 channel information 440(1) including the characteristics measured by measuring component 426 for the out-of-cell beams 416 based on the out-of-cell reporting configuration 436(1). In accordance with the out-of-cell reporting configuration 436(1), the reporting component 428 may generate the out-of-cell L1 channel information 440(1) using long indices to identify the out-of-cell beams 416(1)-(N). Further, the long indices may include a cell identifier and a beam identifier in accordance with an out-of-cell parameter of the out-of-cell reporting configuration 436(1). In addition, the reporting component 428 may transmit the out-of-cell L1 channel information 440(1) over the PUCCH based on the in-cell reporting configuration 434(1). In some aspects, the reporting occasions prescribed within the in-cell reporting configuration 434(1) may be more frequent than the reporting occasions prescribed within the out-of-cell reporting configuration 436(1) in order to reduce the significant overhead associated with generating the out-of-cell L1 channel information 440(1)-(N) for the large number of out-of-cell beams 416(1)-(N) each requiring a length index.

Further, upon receipt of the in-cell L1 channel information 438(1) and the out-of-cell L1 channel information 440(1), the base station 402 may employ the beam management component 418 to evaluate the in-cell beams 408 and the out-of-cell beams 416 and cause one or more beam management operations (e.g., beam selection, beam refinement, beam change, etc.) at the base station 402 and/or the UE 404. For example, the beam management component 418 may transmit a beam operation 444(1) to the UE 404 that causes the UE 404 to form the simultaneous connection 446 with the base station 412(3) based on the characteristics of a beam of the out-of-cell beams 416(3) of the base station 412(3).

Figure 5:
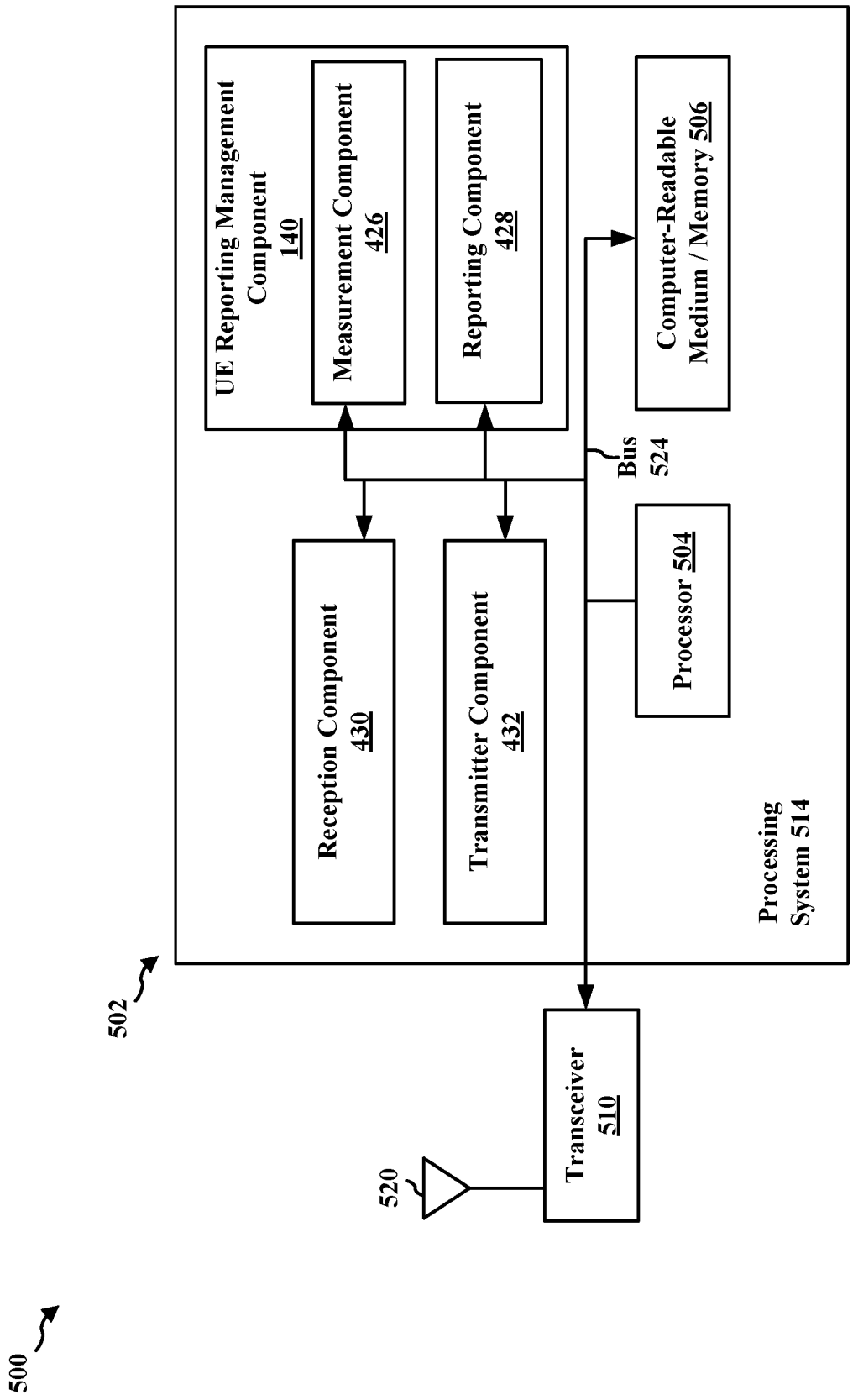
FIG. 5 is a diagram illustrating an example of a hardware implementation for a UE employing a processing system, in accordance with some aspects of the present disclosure.

FIG. 5 is a diagram 500 illustrating an example of a hardware implementation for a UE 502 (e.g., the UE 104, the UE 404, etc.) employing a processing system 514. The processing system 514 may be implemented with a bus architecture, represented generally by the bus 524. The bus 524 may include any number of interconnecting buses and/or bridges depending on the specific application of the processing system 514 and the overall design constraints. The bus 524 links together various circuits including one or more processors and/or hardware components, represented by the processor 504, the UE reporting management component 140, the measurement component 426, the reporting component 428, and the computer-readable medium (e.g., non-transitory computer-readable medium)/memory 506. The bus 524 may also link various other circuits such as timing sources, peripherals, voltage regulators, and power management circuits, which are well known in the art, and therefore, will not be described any further.

The processing system 514 may be coupled with a transceiver 510. The transceiver 510 may be coupled with one or more antennas 520. The transceiver 510 provides a means for communicating with various other apparatus over a transmission medium. The transceiver 510 receives a signal from the one or more antennas, extracts information from the received signal, and provides the extracted information to the processing system 514, specifically the reception component 430. The reception component 430 may receive the in-cell reporting configuration 434, the out-of-cell reporting configuration 436, the reference signals 442, and the beam operations 444. In addition, the transceiver 510 receives information from the processing system 514, specifically the transmitter component 432, and based on the received information, generates a signal to be applied to the one or more antennas. Further, the transmitter component 432 may transmit the in-cell L1 channel information 438 for the in-cell beams 408 and out-of-cell L1 channel information 440 of the out-of-cell beams 416.

The processing system 514 includes a processor 504 coupled with a computer-readable medium/memory 506 (e.g., a non-transitory computer readable medium). The processor 504 is responsible for general processing, including the execution of software stored on the computer-readable medium/memory 506. The software, when executed by the processor 504, causes the processing system 514 to perform the various functions described supra for any particular apparatus. The computer-readable medium/memory 506 may also be used for storing data that is manipulated by the processor 504 when executing software. The processing system 514 further includes at least one of the UE reporting management component 140, the measure component 426, and the reporting component 428. The component may be a software component running in the processor 504, resident/stored in the computer readable medium/memory 506, one or more hardware components coupled with the processor 504, or some combination thereof. The processing system 514 may be a component of the UE 350 and may include the memory 360 and/or at least one of the TX processor 368, the RX processor 356, and the controller/processor 359. Alternatively, the processing system 514 may be the entire UE (e.g., see 350 of FIG. 3).

The UE reporting management component 140 may be configured to manage reporting by the UE 404. Further, the UE reporting management component 140 may include the measurement component 426 for measuring the in-cell beams 408 and the out-of-cell beams 416, and the reporting component 428 for transmitting in-cell L1 channel information 438 for the measured in-cell beams and out-of-cell L1 channel information 440 for the measured out-of-cell beams. As described in detail herein, the out-of-cell reporting configuration 436 may configure the reporting component 428 to employ a periodicity, format, and transport channel for the out-of-cell L1 channel information 440 that reduces the significant overhead associated with reporting the out-of-cell beams 416.

In one configuration, UE 502 for wireless communication includes receiving, from a base station, out-of-cell reporting configuration including an out-of-cell reporting parameter for reporting L1 channel information for an out-of-cell beam; and transmitting, to the base station for beam selection in consideration of simultaneous access to another base station based on the out-of-cell reporting parameter, the L1 channel information for the out-of-cell beam.

The aforementioned means may be one or more of the aforementioned components of the UE 502 and/or the processing system 514 of UE 502 configured to perform the functions recited by the aforementioned means. As described supra, the processing system 514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 6:
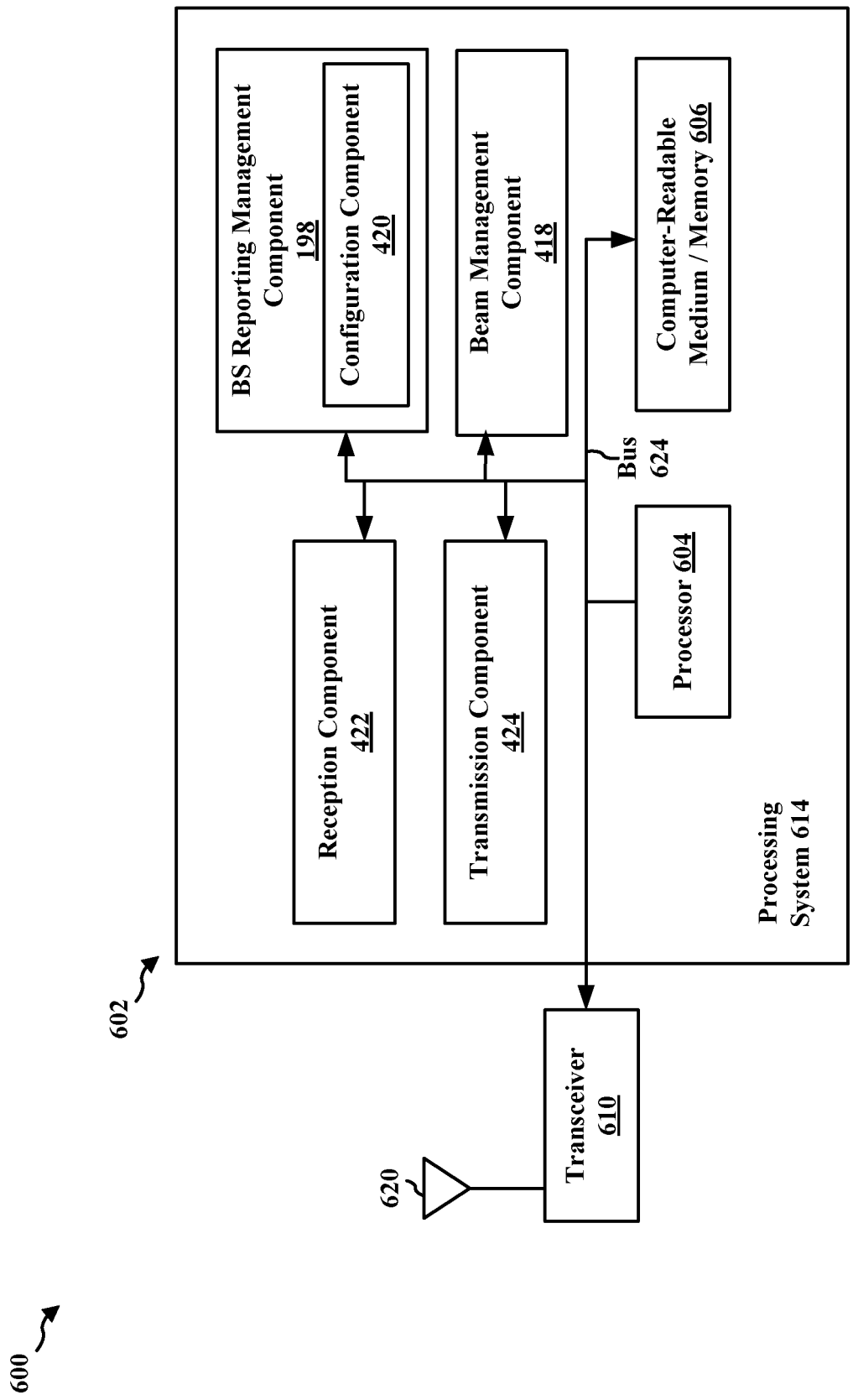
FIG. 6 is a diagram illustrating an example of a hardware implementation for a base station employing a processing system, in accordance with some aspects of the present disclosure.

FIG. 6 is a diagram 600 illustrating an example of a hardware implementation for a base station 602 employing a processing system 614. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware components, represented by the processor 604, the BS reporting management component 198, beam management component 418, configuration component 420, and the computer-readable medium/memory 606. The bus 624 may also link various other circuits such as timing sources, peripherals, voltage regulators, and power management circuits, which are well known in the art, and therefore, will not be described any further.

The processing system 614 may be coupled to a transceiver 610. The transceiver 610 is coupled to one or more antennas 620. The transceiver 610 provides a means for communicating with various other apparatus over a transmission medium. The transceiver 610 receives a signal from the one or more antennas 620, extracts information from the received signal, and provides the extracted information to the processing system 614, specifically the reception component 422. The reception component 422 may receive the in-cell L1 channel information 438 for in-cell beams 408 and the out-of-cell L1 channel information 440 of out-of-cell beams 416. In addition, the transceiver 610 receives information from the processing system 614, specifically the transmitter component 424, and based on the received information, generates a signal to be applied to the one or more antennas 620. Further, the transmitter component 424 may send the in-cell reporting configuration 434, the out-of-cell reporting configuration 436, the reference signals 442, and the beam operations 444.

The processing system 614 includes a processor 604 coupled with a computer-readable medium/memory 606 (e.g., a non-transitory computer readable medium). The processor 604 is responsible for general processing, including the execution of software stored on the computer-readable medium/memory 606. The software, when executed by the processor 604, causes the processing system 614 to perform the various functions described supra for any particular apparatus. The computer-readable medium/memory 606 may also be used for storing data that is manipulated by the processor 604 when executing software. The processing system 614 further includes at least one of the BS reporting management component 198, the configuration component 420, or the beam management component 418. The components may be software components running in the processor 604, resident/stored in the computer readable medium/memory 606, one or more hardware components coupled to the processor 604, or some combination thereof. The processing system 614 may be a component of the base station 310 and may include the memory 376 and/or at least one of the TX processor 316, the RX processor 370, and the controller/processor 375. Alternatively, the processing system 614 may be the entire base station (e.g., see 310 of FIG. 3).

The BS reporting management component 198 may be configured to manage the reporting of channel information of the in-cell beams 408 and the out-of-cell beams 416(1)-(N) by UEs being served by the base station 402. Further, the BS reporting management component 198 may include the configuration component 420 configured to determine configuration parameters for implementing reporting of the channel information. For example, the configuration component 420 may configure the periodicity, format, and transmission channel of the channel information via the configuration parameters of the in-cell reporting configuration 434 and out-of-cell reporting configuration 436. As described in detail herein, the configuration component 420 may employ different values for the in-cell reporting parameters and the out-of-cell parameters in order to mitigate the significant overhead associated with reporting the out-of-cell beams. In addition, the beam management component 418 may be configured to perform beam management operations. For example, in some aspects, the beam management component 418 may be configured to determine whether an individual UE (e.g., the UE 404) served by the base station 402 should form simultaneous connections with the other base stations 412(1)-(N) based on the channel information.

In one configuration, the base station 602 for wireless communication includes means for sending, to a UE for an out-of-cell beam measured at the UE, reporting configuration including an out-of-cell reporting parameter for reporting L1 channel information for the out-of-cell beam; receiving, from the UE for consideration of simultaneous access of the base station and another base station, the L1 channel information for the out-of-cell beam based on the out-of-cell reporting parameter; determining to instruct the UE to enter a simultaneous access mode with another base station based on the L1 channel information for the out-of-cell beam; and transmitting a beam operation instructing the UE to enter the simultaneous access mode using the out-of-cell beam.

The aforementioned means may be one or more of the aforementioned components of the base station 602 and/or the processing system 614 of the base station 602 configured to perform the functions recited by the aforementioned means. As described supra, the processing system 614 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 7:
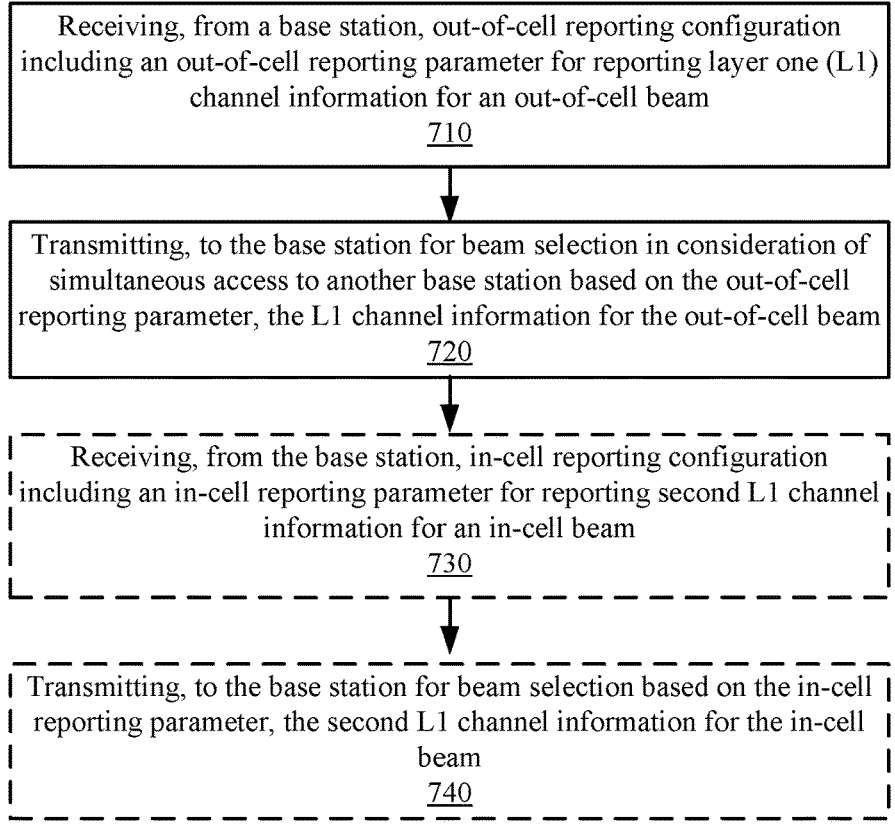
FIG. 7 is a flowchart of an example method of implementing separate layer one (L1) reports for different types of beams at a UE, in accordance with some aspects of the present disclosure.

FIG. 7 is a flowchart of a method 700 of implementing separate L1 reports for different types of beams, in accordance with some aspects of the present disclosure. The method may be performed by a UE (e.g., the UE 104 of FIGS. 1 and 3, which may include the memory 360 and which may be the entire UE 104 or a component of the UE 104, such as the UE reporting management component 140, the TX processor 368, the RX processor 356, and/or the controller/processor 359; the UE 404 of FIG. 4; and/or the UE 502 of FIG. 5).

At block 710, the method 700 includes receiving, from a base station, out-of-cell reporting configuration including an out-of-cell reporting parameter for reporting L1 channel information for an out-of-cell beam. For example, the UE 404 may receive the out-of-cell reporting configuration 436 from the base station 402. Further, in some aspects, the out-of-cell reporting configuration 436 may include one or more out-of-cell reporting parameters defining the periodicity, the format, and/or the transport channel for the out-of-cell L1 channel information 440.

Accordingly, the UE 104, the UE 404, UE 502, the TX processor 368, the RX processor 356, and/or the controller/processor 359, executing the UE reporting management component 140 may provide means for receiving, from a base station, out-of-cell reporting configuration including an out-of-cell reporting parameter for reporting L1 channel information for an out-of-cell beam.

At block 720, the method 700 may include transmitting, to the base station for beam selection in consideration of simultaneous access to another base station based on the out-of-cell reporting parameter, the L1 channel information for the out-of-cell beam. For example, the measurement component 426 may measure the reference signals 442 beamformed by the out-of-cell beams 416. In some embodiments, the measurement component 426 may perform a SINR measurement of the out-of-cell beams 416 or a RSRP measurement of the out-of-cell beams 416. Further, the reporting component 428 may transmit the out-of-cell L1 channel information 440(1) including the measured characteristics of the out-of-cell beams indicated by the reference signals 442. In some aspects, the out-of-cell L1 channel information 440(1) may be a CSI report or a DCI message.

Accordingly, the UE 104, the UE 404, UE 502, the TX processor 368, the RX processor 356, and/or the controller/processor 359 executing the measurement component 426 and the reporting component 428 may provide means for transmitting, to the base station for beam selection in consideration of simultaneous access to another base station based on the out-of-cell reporting parameter, the L1 channel information for the out-of-cell beam.

At block 730, the method 700 may optionally include receiving, from the base station, in-cell reporting configuration including an in-cell reporting parameter for reporting second L1 channel information for an in-cell beam. For example, the UE 404 may receive the in-cell reporting configuration 434 from the base station 402. Further, in some aspects, the in-cell reporting configuration 434 may include one or more in-cell reporting parameters defining the periodicity, the format, and/or the transport channel for the in-cell L1 channel information 438.

As described in detail herein, the out-of-cell reporting configuration 436 may configure the reporting component 428 to apply a different periodicity, format, and transport channel for the out-of-cell L1 channel information 440 in comparison to the in-cell L1 channel information 438 to mitigate or reduce the significant overhead associated with reporting the sheer volume of out-of-cell beams 416. For instance, the out-of-cell reporting parameter may include a periodicity for transmitting the out-of-cell L1 channel information 440 for out-of-cell beams 416 that is longer in duration than the periodicity used for in-cell L1 channel information 438 for in-cell beams 408. In some instances, the out-of-cell reporting parameter may define a format for identifying the out-of-cell beams 416 that is different from the format used to identify in-cell beams 408 in the in-cell L1 channel information 438. For example, the out-of-cell reporting parameter may define a format that identifies each out-of-cell beam with a cell identifier and a beam identifier. In some examples, the cell identifier includes a predefined number of most significant bits of a physical cell identifier of the other cell, a predefined number of least significant bits of a physical cell identifier of the other cell, or the cell identifier includes an identifier of a secondary synchronization signal. In some aspects, the out-of-cell reporting parameter may configure transmission of the out-of-cell L1 channel information 440 for the out-of-cell beams via a different channel than the channel used to transmit the L1 channel information for in-cell beams 408. transmission of the second L1 channel information via a different channel.

Accordingly, the UE 104, the UE 404, UE 502, the TX processor 368, the RX processor 356, and/or the controller/processor 359 executing the UE reporting management component 140 may provide means for receiving, from the base station, in-cell reporting configuration including an in-cell reporting parameter for reporting second L1 channel information for an in-cell beam.

At block 740, the method 700 may optionally include transmitting, to the base station for beam selection based on the in-cell reporting parameter, the second L1 channel information for the in-cell beam. For example, the measurement component 426 may measure the reference signals 442 beamformed by the in-cell beams 408. In some embodiments, the measurement component 426 may perform a SINR measurement of the in-cell beams 408 or a RSRP measurement of the in-cell beams 408. Further, the reporting component 428 may transmit the in-cell L1 channel information 438(1) including the measured characteristics of the in-cell beams provided by the reference signals 442. In some aspects, the in-cell L1 channel information 438(1) may be a CSI report or a DCI message.

Accordingly, the UE 104, the UE 404, UE 502, the TX processor 368, the RX processor 356, and/or the controller/processor 359 executing the measurement component 426 and the reporting component 428 may provide means for transmitting, to the base station for beam selection based on the in-cell reporting parameter, the second L1 channel information for the in-cell beam.

In an additional aspect, the method 700 further comprises connecting to the another base station using the out-of-cell beam based on an instruction received from the base station in response to the L1 channel information. For example, the UE 404 may receive the beam operation 444(1) from the base station 402 instructing the UE 404 to form the connection 446 with the base station 412(3) based on a measured characteristic of one of the out-of-cell beams 416(3). Accordingly, the UE 104, the UE 404, UE 502, the TX processor 368, the RX processor 356, and/or the controller/processor 359 may provide means for connecting to the another base station using the out-of-cell beam based on an instruction received from the base station in response to the L1 channel information.

Figure 8:
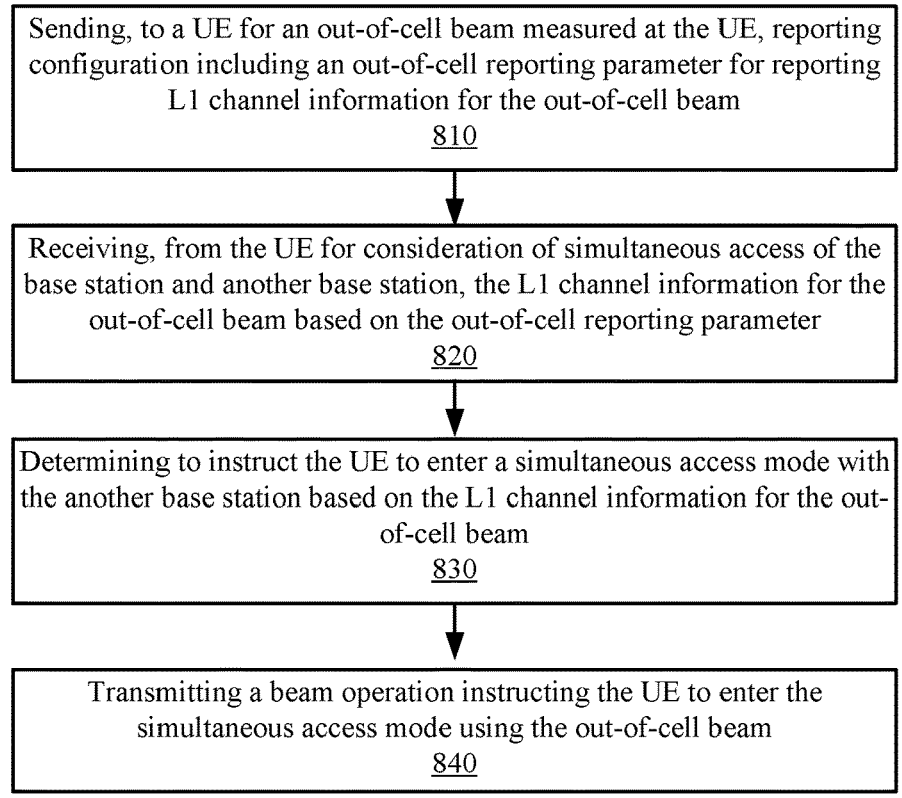
FIG. 8 is a flowchart of an example method of implementing separate layer one (L1) reports for different types of beams at a base station, in accordance with some aspects of the present disclosure.

FIG. 8 is a flowchart of a method 800 of implementing separate L1 reports for different types of beams. The method may be performed by a base station (e.g., the base station 102, which may include the memory 376 and which may be the entire base station or a component of the base station, such as BS reporting management component 198, the beam management component 418, the TX processor 316, the RX processor 370, and/or the controller/processor 375; the base station 402, the base station 602).

At block 810, the method 800 may include sending, for an out-of-cell beam measured at a UE, reporting configuration including an out-of-cell reporting parameter for reporting L1 channel information for the out-of-cell beam.

For example, the BS reporting management component 198 may transmit the out-of-cell reporting configuration 436(1) to the UE 404. In some aspects, out-of-cell reporting configuration 436(1) may include one or more parameters determined by the configuration component 420. The out-of-cell reporting parameters may define the periodicity, the format, and/or the transport channel for the out-of-cell L1 channel information 440 corresponding to the out-of-cell beams 416. For instance, the out-of-cell reporting parameter may include a periodicity for transmitting the out-of-cell L1 channel information 440 for out-of-cell beams 416 that is longer in duration than the periodicity used for in-cell L1 channel information 438 for in-cell beams 408. In some instances, the out-of-cell reporting parameter may define a format for identifying the out-of-cell beams 416 that is different from the format used to identify in-cell beams 408 in the in-cell L1 channel information 438. For example, the out-of-cell reporting parameter may define a format that identifies each out-of-cell beam with a cell identifier and a beam identifier. In some examples, the cell identifier includes a predefined number of most significant bits of a physical cell identifier of the other cell, a predefined number of least significant bits of a physical cell identifier of the other cell, or the cell identifier includes an identifier of a SSS. In some aspects, the out-of-cell reporting parameter may configure transmission of the out-of-cell L1 channel information 440 for the out-of-cell beams via a different channel than the channel used to transmit the L1 channel information for in-cell beams 408.

Accordingly, the base station 102, the TX processor 316, the RX processor 370, and/or the controller/processor 375 executing the BS reporting management component 198 and the configuration component 420 may provide means for sending, to a UE for an out-of-cell beam measured at the UE, reporting configuration including an out-of-cell reporting parameter for reporting L1 channel information for the out-of-cell beam.

At block 820, the method 800 may include receiving, from the UE for consideration of simultaneous access of the base station and another base station, the L1 channel information for the out-of-cell beam based on the out-of-cell reporting parameter. For example, the BS reporting management component 198 may receive the out-of-cell L1 channel information 440(1) from the UE 404 in accordance with the out-of-cell reporting parameter of the out-of-cell configuration information 436(1). In some aspects, the out-of-cell L1 channel information 440(1) may be a CSI report or a DCI message.

Accordingly, the base station 102, the RX processor 370, and/or the controller/processor 375 executing the BS reporting management component 198 may provide receiving, from the UE for consideration of simultaneous access of the base station and another base station, the L1 channel information for the out-of-cell beam based on the out-of-cell reporting parameter.

At block 830, the method 800 may include determining to instruct the UE to enter a simultaneous access mode with the another base station based on the L1 channel information for the out-of-cell beam. For example, the beam management component may determine that a measured characteristic (e.g., SINR, RSP, etc.) of one of the out-of-cell beams 416(3) associated with the base station 412(3) is above a predefined threshold. As a result, the beam management component 418 may determine that the UE 404 should form the simultaneous connection 446 with the base station 412(3).

Accordingly, the base station 102, the RX processor 370, and/or the controller/processor 375 executing the beam management component 418 may provide means for determining to instruct the UE to enter a simultaneous access mode with the another base station based on the L1 channel information for the out-of-cell beam.

At block 840, the method 800 may include transmitting a beam operation instructing the UE to enter the simultaneous access mode using the out-of-cell beam. For example, the base station 402 may transmit a beam operation 446(1) to the UE 404 instructing the UE to form the simultaneous connection 446 with base station 412(3).

Accordingly, the base station 102, the RX processor 370, and/or the controller/processor 375 executing the beam management component 418 may provide means for transmitting a beam operation instructing the UE to enter the simultaneous access mode using the out-of-cell beam.

In an additional or alternative aspect, the method 700 further comprises sending, for an in-cell beam measured at the UE, in-cell reporting configuration including in-cell reporting parameter for reporting second L1 channel information for the in-cell beam, and receiving the second L1 channel information for the in-cell beam based on the in-cell reporting parameter. For example, the BS reporting management component 198 may transmit the in-cell reporting configuration 434(1) to the UE 404. In some aspects, in-cell reporting configuration 434(1) may include one or more parameters determined by the configuration component 420. Further, BS reporting management component 198 may receive the in-cell L1 channel information 438(1) from the UE 404 in accordance with the in-cell reporting parameter of the in-cell configuration information 434(1). In some aspects, the in-cell L1 channel information 440(1) may be a CSI report or a DCI message. Accordingly, the base station 102, the TX processor 316, the RX processor 370, and/or the controller/processor 375 executing the BS reporting management component 198 and the configuration component 420 may provide means for sending, for an in-cell beam measured at the UE, in-cell reporting configuration including in-cell reporting parameter for reporting second L1 channel information for the in-cell beam, and receiving the second L1 channel information for the in-cell beam based on the in-cell reporting parameter.

sending, for an in-cell beam measured at the UE, in-cell reporting configuration including in-cell reporting parameter for reporting second L1 channel information for the in-cell beam, and receiving the second L1 channel information for the in-cell beam based on the in-cell reporting parameter The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person having ordinary skill in the art to practice the various aspects described herein. Various modifications to these aspects will be readily apparent to a person having ordinary skill in the art, and the generic principles defined herein may be applied to other aspects. The claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to a person having ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Clauses

A. A method of wireless communication at a user equipment (UE), comprising: receiving, from a base station, out-of-cell reporting configuration including an out-of-cell reporting parameter for reporting layer one (L1) channel information for an out-of-cell beam; and transmitting, to the base station, for beam selection in consideration of simultaneous access to another base station based on the out-of-cell reporting parameter, the L1 channel information for the out-of-cell beam.

B. The method as paragraph A recites, wherein the L1 channel information is first L1 channel information, and the method further comprising: receiving, from the base station, in-cell reporting configuration including an in-cell reporting parameter for reporting second L1 channel information for an in-cell beam; and transmitting, to the base station, for beam selection based on the in-cell reporting parameter, the second L1 channel information for the in-cell beam, wherein the out-of-cell reporting parameter includes a first periodicity for transmitting the first L1 channel information and the in-cell reporting parameter includes a second periodicity for transmitting the second L1 channel information, with the first periodicity being longer than the second periodicity.

C. The method as any of paragraphs A-B recites, wherein the L1 channel information is first L1 channel information, and the method further comprising: receiving, from the base station, in-cell reporting configuration including an in-cell reporting parameter for reporting second L1 channel information for an in-cell beam; and transmitting, to the base station, for beam selection based on the in-cell reporting parameter, the second L1 channel information for the in-cell beam, wherein the out-of-cell reporting parameter includes a first format for identifying the out-of-cell beam and the in-cell reporting parameter includes a second format different from the first format for identifying the in-cell beam.

D. The method as paragraph C recites, wherein the first format includes a cell identifier of another cell and a beam identifier of the out-of-cell beam of the another cell, and the second format includes a beam identifier of the in-cell beam.

E. The method as paragraph D recites, wherein the cell identifier includes a predefined number of most significant bits of a physical cell identifier of the another cell.

F. The method as paragraph D recites, wherein the cell identifier includes a predefined number of least significant bits of a physical cell identifier of the another cell.

G. The method as paragraph D recites, wherein the cell identifier includes an identifier of a secondary synchronization signal.

H. The method as any of paragraphs A-G recite, wherein, the L1 channel information is first L1 channel information, and the method further comprising: receiving, from the base station, in-cell reporting configuration including an in-cell reporting parameter for reporting second L1 channel information for an in-cell beam; and transmitting, to the base station, for beam selection based on the in-cell reporting parameter, the second L1 channel information for the in-cell beam, wherein the out-of-cell reporting parameter configures transmission of the first L1 channel information via a first channel and the in-cell reporting parameter configures transmission of the second L1 channel information via a second channel with the first channel and second channels being different channels.

I. The method as paragraph K recites, wherein the first channel is a physical uplink shared channel (PUSCH).

J. The method as paragraph K recites, wherein the first channel is a physical uplink control channel (PUCCH).

K. The method as any of paragraphs A-J recite, further comprising determining the L1 channel information by performing a signal-to-noise ratio (SINR) measurement of the out-of-cell beam.

L. The method as any of paragraphs A-K recite, further comprising determining the L1 channel information by performing a reference signal receive power (RSRP) measurement of the out-of-cell beam.

M. The method as any of paragraphs A-L recite, wherein the out-of-cell reporting configuration is a channel state information report configuration (CSI ReportConfig) message.

N. The method as any of paragraphs A-L recite, wherein the out-of-cell reporting configuration is a downlink control information (DCI) message.

O. The method as any of paragraphs A-N recite, further comprising connecting to the another base station using the out-of-cell beam based on an instruction received from the base station in response to the L1 channel information.

P. The method as any of paragraphs A-N recite, further comprising connecting to the another base station using the out-of-cell beam based on an instruction received from the base station in response to the L1 channel information.

Q. A user equipment for wireless communication, comprising a memory storing computer-executable instructions; and at least one processor coupled with the memory and configured to execute the computer-executable instructions to perform the method of any of claims A-P.

R. A user equipment for wireless communication, comprising means for performing the method of any of claims A-P.

S. A non-transitory computer-readable medium storing computer executable code, the code when executed by a processor causes the processor to perform the method of any of claims A-P.

T. A method of wireless communication at a base station, the method comprising: sending, to a user equipment (UE) for an out-of-cell beam measured at the UE, reporting configuration including an out-of-cell reporting parameter for reporting layer one (L1) channel information for the out-of-cell beam; receiving, from the UE for consideration of simultaneous access of the base station and another base station, the L1 channel information for the out-of-cell beam based on the out-of-cell reporting parameter; determining to instruct the UE to enter a simultaneous access mode with the another base station based on the L1 channel information for the out-of-cell beam; and transmitting a beam operation instructing the UE to enter the simultaneous access mode using the out-of-cell beam.

U. The method as paragraph T recites, wherein the L1 channel information is first L1 channel information, and the method further comprising: sending, for an in-cell beam measured at the UE, in-cell reporting configuration including in-cell reporting parameter for reporting second L1 channel information for the in-cell beam; and receiving the second L1 channel information for the in-cell beam based on the in-cell reporting parameter, wherein the out-of-cell reporting parameter includes a first periodicity for transmission of the first L1 channel information by the UE and the in-cell reporting parameter includes a second periodicity for transmission of the second L1 channel information by the UE, with the first periodicity being longer than the second periodicity.

V. The method as any of paragraphs T-U recite, wherein the L1 channel information is first L1 channel information, and the method further comprising: sending, for an in-cell beam measured at the UE, in-cell reporting configuration including an in-cell reporting parameter for reporting second L1 channel information for the in-cell beam; and receiving the second L1 channel information for the in-cell beam based on the in-cell reporting parameter, wherein the out-of-cell reporting parameter includes a first format for identifying the out-of-cell beam and the in-cell reporting parameter includes a second format different from the first format for identifying in-cell beam.

W. The method as paragraph V recites, wherein the first format includes a cell identifier of another cell and a beam identifier of the out-of-cell beam of the another cell, and the second format includes a beam identifier of the in-cell beam.

X. A base station for wireless communication, comprising a memory storing computer-executable instructions; and at least one processor coupled with the memory and configured to execute the computer-executable instructions to perform the method of any of claims T-W.

Y. A base station for wireless communication, comprising means for performing the method of any of claims T-W.

Z. A non-transitory computer-readable medium storing computer executable code, the code when executed by a processor causes the processor to perform the method of any of claims T-W.

What is claimed is:

1. A method of wireless communication at a user equipment (UE), the method comprising:
   receiving, from a base station, out-of-cell reporting configuration including an out-of-cell reporting parameter for configuring formatting of reporting of first layer one (L1) channel information for an out-of-cell beam;
   receiving, from the base station, in-cell reporting configuration including an in-cell reporting parameter for configuring formatting of reporting of second L1 channel information for an in-cell beam, wherein the in-cell reporting parameter differs from the out-of-cell reporting parameter; and transmitting, to the base station, for beam selection in consideration of simultaneous access to another base station based on the out-of-cell reporting parameter, the first L1 channel information for the out-of-cell beam.

2. The method of claim 1, the method further comprising:
transmitting, to the base station, for beam selection based on the in-cell reporting parameter, the second L1 channel information for the in-cell beam, wherein the out-of-cell reporting parameter includes a first periodicity for transmitting the first L1 channel information and the in-cell reporting parameter includes a second periodicity for transmitting the second L1 channel information, with the first periodicity being longer than the second periodicity.

3. The method of claim 1, the method further comprising:
transmitting, to the base station, for beam selection based on the in-cell reporting parameter, the second L1 channel information for the in-cell beam, wherein the out-of-cell reporting parameter includes a first format for identifying the out-of-cell beam and the in-cell reporting parameter includes a second format different from the first format for identifying the in-cell beam.

4. The method of claim 3, wherein the first format includes a cell identifier of another cell and a beam identifier of the out-of-cell beam of the another cell, and the second format includes a beam identifier of the in-cell beam.

5. The method of claim 4, wherein the cell identifier includes a predefined number of most significant bits of a physical cell identifier of the another cell.

6. The method of claim 4, wherein the cell identifier includes a predefined number of least significant bits of a physical cell identifier of the another cell.

7. The method of claim 4, wherein the cell identifier includes an identifier of a secondary synchronization signal.

8. The method of claim 1, the method further comprising:
transmitting, to the base station, for beam selection based on the in-cell reporting parameter, the second L1 channel information for the in-cell beam, wherein the out-of-cell reporting parameter configures transmission of the first L1 channel information via a first channel and the in-cell reporting parameter configures transmission of the second L1 channel information via a second channel with the first channel and second channel being different channels.

9. The method of claim 8, wherein the first channel is a physical uplink shared channel (PUSCH).

10. The method of claim 8, wherein the first L1 channel is a physical uplink control channel (PUCCH).

11. The method of claim 1, further comprising determining the first L1 channel information by performing a signal-to-noise ratio (SINR) measurement of the out-of-cell beam.

12. The method of claim 1, further comprising determining the first L1 channel information by performing a reference signal receive power (RSRP) measurement of the out-of-cell beam.

13. The method of claim 1, wherein the out-of-cell reporting configuration is a channel state information report configuration (CSI ReportConfig) message.

14. The method of claim 1, wherein the out-of-cell reporting configuration is a downlink control information (DCI) message.

15. The method of claim 1, further comprising connecting to the another base station using the out-of-cell beam based on an instruction received from the base station in response to the first L1 channel information.

16. A user equipment (UE) for wireless communication, comprising:
a memory storing computer-executable instructions; and
at least one processor coupled with the memory and configured to execute the computer-executable instructions to:
receive, from a base station, out-of-cell reporting configuration including an out-of-cell reporting parameter for configuring formatting of reporting of first layer one (L1) channel information for an out-of-cell beam;
receive, from the base station, in-cell reporting configuration including an in-cell reporting parameter for configuring formatting of reporting of second L1 channel information for an in-cell beam, wherein the in-cell reporting parameter differs from the out-of-cell reporting parameter; and
transmit, to the base station for beam selection in consideration of simultaneous access to another base station based on the out-of-cell reporting parameter, the first L1 channel information for the out-of-cell beam.

17. The UE of claim 16, wherein the at least one processor is further configured to:
transmit, to the base station for beam selection based on the in-cell reporting parameter, the second L1 channel information for the in-cell beam, wherein the out-of-cell reporting parameter includes a first periodicity for transmitting the first L1 channel information and the in-cell reporting parameter includes a second periodicity for transmitting the second L1 channel information, with the first periodicity being longer than the second periodicity.

18. The UE of claim 16, wherein the at least one processor is further configured to:
transmit, to the base station for beam selection based on the in-cell reporting parameter, the second L1 channel information for the in-cell beam, wherein the out-of-cell reporting parameter includes a first format for identifying the out-of-cell beam and the in-cell reporting parameter includes a second format different from the first format for identifying in-cell beam.

19. The UE of claim 16, wherein the at least one processor is further configured to:
receive, from the base station, in-cell reporting configuration including an in-cell reporting parameter for reporting an in-cell beam; and
transmit, to the base station for beam selection based on the in-cell reporting parameter, second L1 channel information including layer one state information for the in-cell beam, wherein the out-of-cell reporting parameter configures transmission of the first L1 channel information via a channel and the in-cell reporting parameter configures transmission of the second L1 channel information via a different channel.

20. The UE of claim 16, wherein the out-of-cell reporting configuration is a channel state information report configuration (CSI ReportConfig) message.

21. The UE of claim 16, wherein the out-of-cell reporting configuration is a downlink control information (DCI) message.

22. A method of wireless communication at a base station, the method comprising:
sending, to a user equipment (UE) for an out-of-cell beam measured at the UE, reporting configuration including an out-of-cell reporting parameter for configuring formatting of reporting of first layer one (L1) channel information for the out-of-cell beam;

sending, for an in-cell beam measured at the UE, in-cell reporting configuration including in-cell reporting parameter for configuring formatting of reporting of second L1 channel information for the in-cell beam, wherein the in-cell reporting parameter differs from the out-of-cell reporting parameter; and receiving, from the UE for consideration of simultaneous access of the base station and another base station, the first L1 channel information for the out-of-cell beam based on the out-of-cell reporting parameter;

determining to instruct the UE to enter a simultaneous access mode with the another base station based on the first L1 channel information for the out-of-cell beam; and transmitting a beam operation instructing the UE to enter the simultaneous access mode using the out-of-cell beam.

23. The method of claim 22, the method further comprising:

receiving the second L1 channel information for the in-cell beam based on the in-cell reporting parameter, wherein the out-of-cell reporting parameter includes a first periodicity for transmission of the first L1 channel information by the UE and the in-cell reporting parameter includes a second periodicity for transmission of the second L1 channel information by the UE, with the first periodicity being longer than the second periodicity.

24. The method of claim 22, the method further comprising:

receiving the second L1 channel information for the in-cell beam based on the in-cell reporting parameter, wherein the out-of-cell reporting parameter includes a first format for identifying the out-of-cell beam and the in-cell reporting parameter includes a second format different from the first format for identifying in-cell beam.

25. The method of claim 24, wherein the first format includes a cell identifier of another cell and a beam identifier of the out-of-cell beam of the another cell, and the second format includes a beam identifier of the in-cell beam.

26. A base station for wireless communication, comprising:

a memory storing computer-executable instructions; and at least one processor coupled with the memory and configured to execute the computer-executable instructions to:

transmit, to a user equipment (UE) for an out-of-cell beam measured at the UE, out-of-cell reporting configuration including an out-of-cell reporting parameter for configuring formatting of reporting of layer one (L1) channel information for the out-of-cell beam;

transmit, for an in-cell beam measured at the UE, in-cell reporting configuration including an in-cell reporting parameter for configuring formatting of reporting of L1 channel information for the in-cell beam, wherein the in-cell reporting parameter differs from the out-of-cell reporting parameter;

receive the L1 channel information for the out-of-cell beam based on the out-of-cell reporting parameter;

determine to instruct the UE to enter a simultaneous access mode with another base station based on the L1 channel information; and transmit a beam operation instructing the UE to enter the simultaneous access mode using the out-of-cell beam.

27. The base station of claim 26, wherein the at least one processor is further configured to:

receive the L1 channel information for the in-cell beam based on the in-cell reporting parameter, wherein the out-of-cell reporting parameter includes a first periodicity for transmitting the first L1 channel information and the in-cell reporting parameter includes a second periodicity for transmitting the second L1 channel information, with the first periodicity being longer than the second periodicity.

28. The base station of claim 26, the at least one processor is further configured to:

receive the L1 channel information for the in-cell beam based on the in-cell reporting parameter, wherein the out-of-cell reporting parameter includes a first format for identifying the out-of-cell beam and the in-cell reporting parameter includes a second format different from the first format for identifying the in-cell beam.

29. The base station of claim 28, wherein the first format includes a cell identifier of the another cell and a beam identifier of the out-of-cell beam, and the second format includes a beam identifier of the in-cell beam.

30. The base station of claim 29, wherein the cell identifier includes an identifier of a secondary synchronization signal.

* * * * *